March 9, 1954 — E. A. FIELD — 2,671,615
BAROMETRIC DRAFT REGULATOR
Filed March 5, 1951 — 2 Sheets-Sheet 1

INVENTOR.
Edward A. Field
BY Otis A. Earl
Attorney.

March 9, 1954 E. A. FIELD 2,671,615
BAROMETRIC DRAFT REGULATOR
Filed March 5, 1951 2 Sheets—Sheet 2

INVENTOR.
Edward A. Field
BY
Attorney.

Patented Mar. 9, 1954

2,671,615

UNITED STATES PATENT OFFICE 2,671,615

BAROMETRIC DRAFT REGULATOR

Edward A. Field, Mendota, Ill.

Application March 5, 1951, Serial No. 213,985

15 Claims. (Cl. 236—45)

This invention relates to improvements in barometric draft regulators.

The main objects of this invention are:

First, to provide improved bearings for pivotally supporting a control gate of a draft regulator adapted to be attached to a smoke flue.

Second, to provide bearings of the type above described which are self-aligning to insure a long life and a very sensitive and accurate operation of the draft control gate supported thereby.

Third, to provide bearings of the above type which may be readily and economically produced and installed and which are highly efficient in use.

Further objects relative to details and economies of this invention will appear from the description to follow. The invention is defined in the claims.

A structure which embodies the features of my invention is illustrated in the accompanying drawings, wherein.

Figure 4:
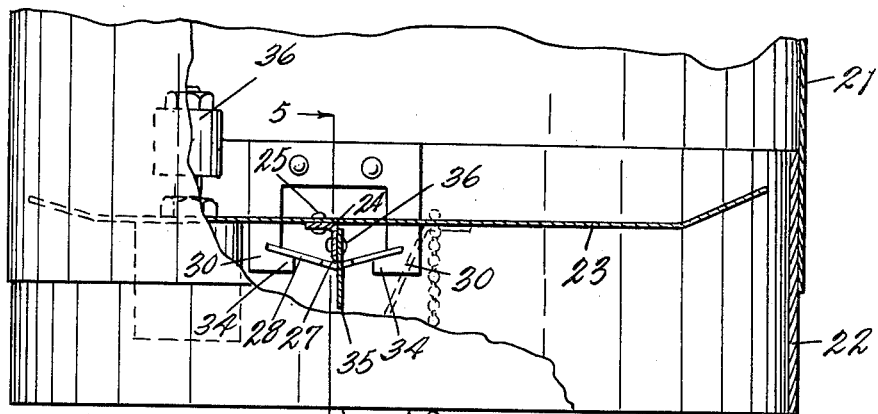
Figure 5:
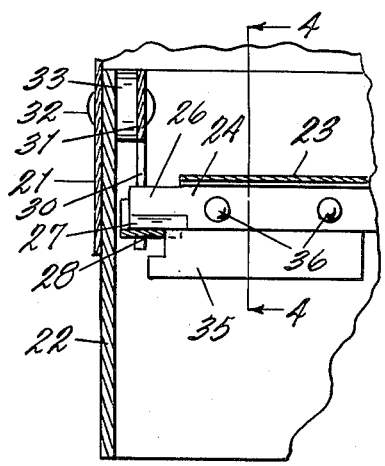

Fig. 4, illustrating a second embodiment of the invention, is a side elevation of a gate housing showing a portion of the gate housing broken away, and parts within the housing in section on line 4—4 of Fig. 5.

Fig. 5 is an enlarged detail view in section on the line 5—5 of Fig. 4.

Figure 6:
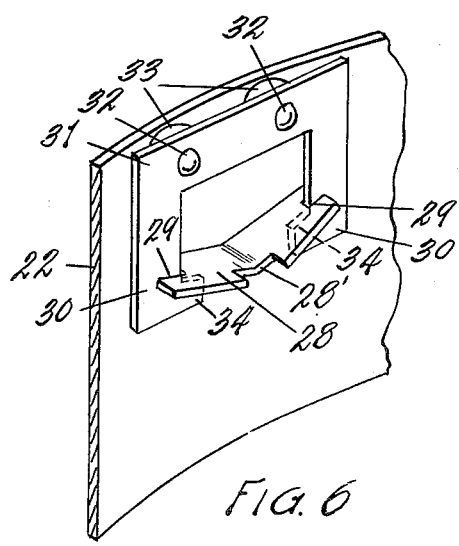

Fig. 6 is an enlarged perspective view of one of the control gate bearings attached to the gate housing.

Figure 1:
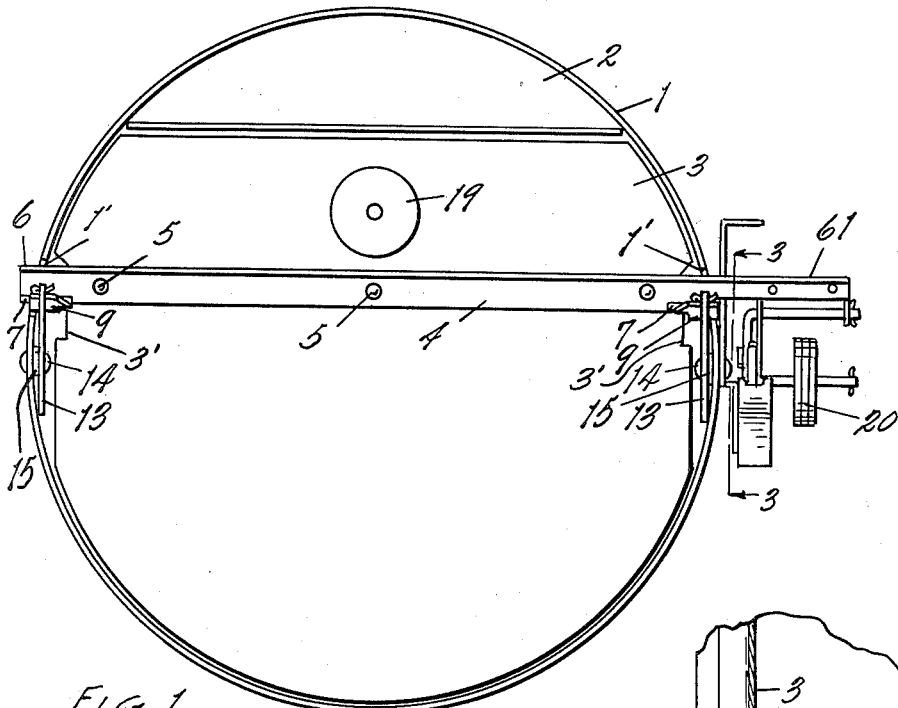
Fig. 1 is an end view of the regulator showing a control gate housing a control gate, and bearings for pivotally supporting the gate, in operative relation to each other.
Figure 3:
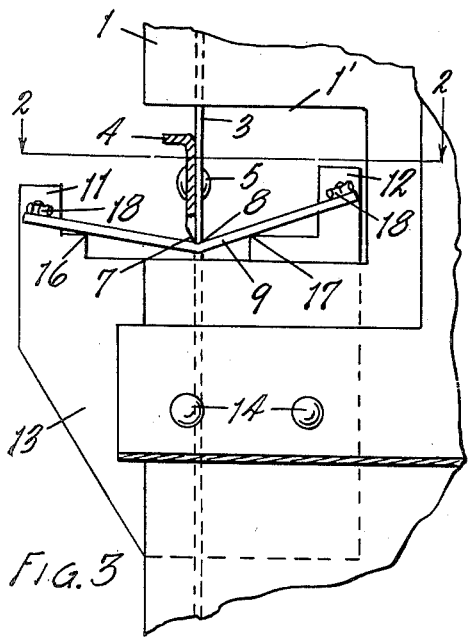
Fig. 3 is an enlarged detail view in vertical section on the line 3—3 of Figs. 1 and 2 showing one of the bearings for the gate, the gate and gate housing in relation to each other.
Figure 2:
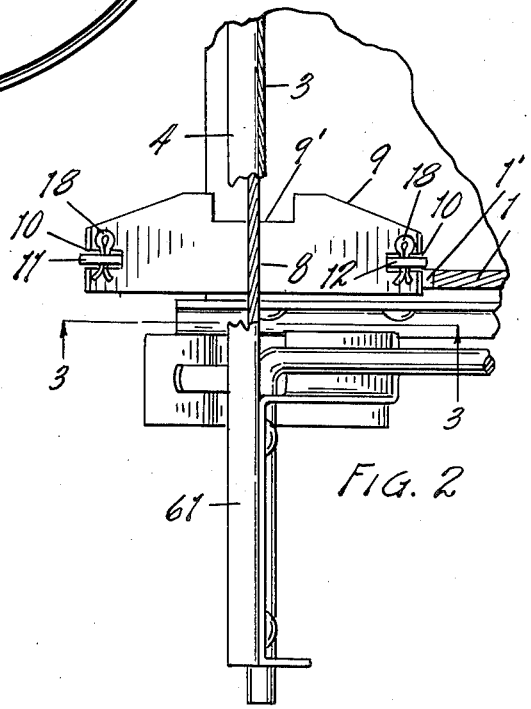
Fig. 2 is an enlarged detail view in horizontal section on the line 2—2 of Fig. 3, showing one of the bearings for the gate, the gate and the gate housing in relation to each other.

Referring to the embodiment of the invention illustrated in Figs. 1, 2 and 3, I designates a gate housing adapted for attachment to one of the sides of a smoke flue not shown.

A member 2 in the form of a segment is spot welded or otherwise fixedly secured to the housing at the top and adjacent to the front thereof. A control gate 3 is pivotally mounted in the housing I adjacent the outer end thereof and beneath the segment 2. The upper part of the gate is cut away so as to swing by the segment without interference. An angle member 4 is secured by means of rivets 5 to the front side of the gate, and is provided with end portions 6 and 6I projecting beyond the opposite sides of the gate and disposed in the forwardly opening recesses I' in the gate housing. These end portions are provided with knife edges 7 on the lower edges of the vertical flanges thereof. The knife edges pivotally engage in V-shaped recesses 8 in pivot bearing members 9. Each bearing member is provided with open ended slots 10 at the opposite ends thereof as shown in Fig. 2. These slots receive spaced arms 11 and 12 projecting upwardly from a plate-like supporting member 13 fixedly secured by means of rivets or bolts 14 to the inner side of the gate housing. A spacer 15 through which the rivets 14 pass is disposed between the supporting member and gate housing as shown in Fig. 1. The general plane of the supporting plate 13 is disposed substantially parallel to the general plane of the adjacent portion of the gate housing I as shown in Figs. 1 and 3. The supporting member 13 is provided with shoulders 16 and 17 inwardly of the arms 11 and 12 for engagingly supporting the bearing member 9 as shown in Fig. 3. The shoulders 16 and 17 being relatively narrow as compared to the width of the bearing member 9 facilitates a lateral tilting-like action of the bearing member so that the knife edge 7 engages the bearing member 9 across the entire width thereof, in the event that the bearing member 9 on one side of the gate housing is not properly aligned with the corresponding bearing member on the opposite side of the housing. The width of the slots 10 in the bearing member 9 is considerably greater than the thickness of the arms 11 and 12, as shown in Fig. 2, to permit lateral tilting of the bearing member relative to the arms 11 and 12. The pivotal axis of the bearing member 9 on the shoulders 16 and 17 is disposed substantially parallel to the general plane of the adjacent portion of the gate housing as shown in Figs. 2 and 3. Cotter pins 18 through the arms 11 and 12 retain the bearing members on the arms. Recesses 3' in the gate 3 disposed to embrace the bearing members 9, and recesses 9' in the bearing members 9 disposed to embrace the gate limits displacement of the gate relative to the bearing members. The inner edge portions of the bearing members 9 are engageable with the side edges of the gate to limit displacement of the gate edgewise of itself, as is shown in Fig. 1.

The shoulder 17 is slightly closer to the knife edge 7 than the shoulder 16 and the end of the bearing member 9 engages the shoulder 17 is slightly steeper than the opposite end engaging the shoulder 16. This provides greater resistance to displacement of the knife edge 7 caused by inward thrust on the gate due to an updraft than to outward thrust against the gate due to a down draft.

The bearing members 9 being self aligning permits the same to be relatively wide and the coacting knife edges relatively long for long life of the knife edges and easy swinging movement of the gate.

Means designated generally by the numerals 19 and 20 produce a closing torque on the gate. This means forming no part of the subject matter of this application, is not further described.

In the embodiment of the invention shown in Figs. 4, 5 and 6, 21 designates a collar opening to and projecting downwardly from a smoke flue not shown. Telescoped within and secured to this collar is a gate housing 22 having a control gate 23 mounted therein. An angle member 24 constituting a pivot member for the gate is fixedly secured to the gate by means of rivets 25 extending through the gate and the horizontal flange of the angle member. The angle member has end portions 26 projecting beyond the opposite side edges of the gate. These opposite end portions are each provided with a knife edge 27 on the lower edge of the vertical flange thereof, which engages in the recess of the plate-like bearing member 28 bent to a V-shape and provided with open ended slots 29 at the opposite ends thereof, which embracingly receive the depending arms 30 of an inverted U-shaped plate-like supporting member 31 fixedly secured to the gate housing 22 by means of rivets 32. Spacers 33 through which the rivets 32 pass space the bearing supporting member from the gate housing. Lugs 34 projecting inwardly from the arms 30 supportingly engage the bearing member 28. The width of the slots 29 being slightly greater than the thickness of arms 30, as in the embodiment previously described permits laterally tilting movement of the bearing member about the lugs as pivot members, so as to align the bearing member with the knife edge 27 of the pivot member. A member 35 secured by means of rivets 36 to the pivot member 24 projects beneath the bearing member 28 to limit vertical and horizontal displacement of the gate relative to the bearing member. A recess 28′ in the bearing member 28 receives the end of member 35 to limit lateral displacement of the gate. The inner edge of the bearing member 28 is engageable with an outer edge of the member 35 to limit displacement of the gate edgewise of itself, as is shown in Fig. 5.

The bearing members 28 being self-aligning permits the same to be relatively wide and the contacting knife edges 27 relatively long for long life of the knife edges and easy swinging movement of the gate during either up drafts or down drafts.

Weighting means designated generally by the numerals 36 and 37 produce a closing torque of the gate. This means forming no part of the subject matter of this application, is not further described.

I have illustrated and described my invention in embodiments which I have found very practical. I have not attempted to illustrate or describe other embodiments or adaptations as it is believed that this disclosure will enable those skilled in the art to embody or adapt my invention as may be desired.

Having thus described my invention what I claim as new and desire to secure by Letters Patent is:

1. In a draft regulating device, an open ended gate housing for opening laterally from a smoke flue, a control gate in said housing and disposed approximately vertically when closed, pivot members on said gate adjacent to the opposite side edges of the gate and adjacent to opposite sides of the gate housing, plate-like bearing members disposed generally at right angles to the portions of the gate housing adjacent thereto and bent to provide V-shaped recesses for pivotally receiving said pivot members, said bearing members having open ended slots positioned in spaced relation from opposite sides of said pivot members, and plate-like supporting members secured to the housing wall in laterally spaced relation therefrom and disposed generally parallel to the portion of the gate housing adjacent thereto and having upwardly projecting arms received in said slots of the bearing members and having shoulders disposed inwardly of said arms for supportingly engaging said bearing members for rocking movement thereof on said shoulders.

2. In a draft regulating device, a gate housing, a control gate disposed in said housing, pivot members on said gate adjacent opposite side edges of said gate and adjacent to opposite sides of the gate housing, plate-like bearing members disposed generally at right angles to the portions of the gate housing adjacent thereto and bent to provide V-shaped recesses for pivotally receiving said pivot members, and means for pivotally supporting said bearing members for rocking movement, the axes of pivotal movement of said bearing members being disposed transversely of said pivot members, said supporting means comprising plate-like members secured to said housing with the general planes thereof disposed in substantially parallel relation to the general planes of the adjacent portions of the gate housing and having spaced arms extending upwardly through said bearing members, said plate-like members having shoulders disposed inwardly of said arms for supportingly engaging said bearing members for rocking movement thereof on said shoulders.

3. In a draft regulating device, a gate housing, a control gate disposed in said housing, pivot members on said gate adjacent opposite side edges of said gate and adjacent to opposite sides of the gate housing, plate-like bearing members disposed generally at right angles to the portions of the gate housing adjacent thereto and bent to provide V-shaped recesses for pivotally receiving said pivot members, and means on said housing for pivotally supporting said bearing members for rocking movement, the axes of pivotal movement of said bearing members being disposed transversely of said pivot members and substantially parallel to the general planes of the adjacent portions of the gate housing.

4. In a draft regulating device, a gate housing, a control gate disposed to open inwardly of said housing, pivot members on said gate adjacent opposite side edges of said gate and adjacent to opposite sides of the gate housing, plate-like bearing members disposed generally at right angles to the portions of the gate housing adjacent thereto and having V-shaped recesses in which said pivot members are supported, and having open-ended slots positioned in spaced relation from opposite sides of said pivot members and extending in a direction transversely on said pivot members, and plate-like supporting members secured to said gate housing with the general planes thereof disposed in substantially parallel relation to the general planes of the adjacent portions of the gate housing and having upwardly projecting arms disposed in said slots, said supporting members having shoulders disposed adjacent said arms for supportingly engaging said bearing members for rocking movement thereof about said shoulders.

5. In a draft regulating device, a gate housing, a control gate disposed to open inwardly of said housing, pivot members on said gate adjacent opposite side edges of said gate, bearing members having V-shaped recesses in which said pivot members are supported, and having slots positioned in spaced relation from opposite sides of said pivot members and extending in a direction transversely of said pivot members, and supporting members secured to said gate housing and having upwardly projecting arms disposed in said slots said supporting members having shoulders disposed adjacent said arms for supportingly engaging said bearing members for rocking movement thereof about said shoulders, the pivotal axes of the bearing members on the shoulders being disposed substantially parallel to the general planes of the portions of the housing adjacent to the bearing members.

6. In a draft regulating device an open ended gate housing, a control gate disposed to open inwardly said housing, pivot members on said gate adjacent opposite side edges of the gate and adjacent to opposite sides of the gate housing, bearing members having V-shaped recesses for pivotally receiving said pivot members, and means secured to said housing for pivotally supporting said bearing members, the pivotal axes of the bearing members being disposed transversely of said pivot members and substantially parallel to the general planes of the adjacent portions of the gate housing, said bearing member supporting means including plate-like members having spaced arms for rockingly and supportingly receiving the bearing members therebetween.

7. In a draft regulating device an open ended gate housing, a control gate disposed in to open inwardly of said housing, pivot members on said gate adjacent opposite side edges of the gate and adjacent to opposite sides of the gate housing, bearing members having V-shaped recesses for pivotally receiving said pivot members, and means secured to said housing for pivotally supporting said bearing members, the pivotal axes of the bearing members being disposed transversely of said pivot members and substantially parallel to the general planes of the adjacent portions of the gate housing.

8. In a draft regulating device, an open ended gate housing, a control gate disposed to open inwardly of said housing, pivot members on said gate adjacent opposite side edges of said gate and adjacent to opposite sides of the gate housing, bearing members for pivotally receiving said pivot members, means on said housing for pivotally supporting the bearing members at the opposite ends thereof in spaced relation from the opposite sides of said pivot members, the pivotal axes of the bearing members extending transversely of said pivot member and extending substantially parallel to the general planes of the portions of the housing to which the supporting means is secured, and means associated with the gate and movable therewith and engageable with the inner edges of said bearing members for limiting displacement of the gate edgewise of itself.

9. In a draft regulating device, an open ended gate housing, a control gate disposed to open inwardly of said housing, pivot members secured to said gate, and disposed adjacent opposite side edges of the gate and adjacent to opposite sides of the gate housing, bearing members for said pivot members, and means secured to the housing for pivotally supporting said bearing members, said bearing members being slotted at the opposite ends thereof in spaced relation from said pivot members for receiving said supporting means, the pivotal axes of said bearing members extending transversely of the pivotal axes of said pivot members and extending substantially parallel to the general planes of the portions of the housing to which the supporting means is secured.

10. In a draft regulating device an open ended gate housing opening downwardly, a control gate disposed in said housing, pivot members on said gate adjacent opposite side edges of the gate and adjacent to opposite sides of the gate housing, plate-like bearing members bent to provide V-shaped recesses for pivotally receiving said pivot members, said bearing members having open ended vertical slots positioned in spaced relation from opposite sides of said pivot members, plate-like supporting members secured in spaced relation from the housing wall and disposed generally parallel to the portions of the housing wall adjacent thereto and having depending arms having inwardly directed lugs at the lower ends thereof, the arms being received in said slots of the bearing members and the lugs supportingly engaging said bearing members for rocking movements thereof on said lugs.

11. In a draft regulating device an open ended gate housing opening downwardly, a control gate disposed in said housing, pivot members on said gate adjacent opposite sides of the gate and adjacent to opposite sides of the gate housing, bearing members having V-shaped recesses for pivotally receiving said pivot members, said bearing members having slots positioned in spaced relation from opposite sides of said pivot members, supporting members secured in spaced relation from the housing wall and having depending arms having inwardly directed lugs at the lower ends thereof the arms being received in said slots of the bearing members and the lugs supportingly engaging said bearing members for rocking movement thereof on said lugs, the axes of rocking movement of the bearing members on said lugs being disposed substantially parallel to the portions of the gate housing adjacent to the supporting members.

12. In a draft regulator, an open ended gate housing, a control gate disposed to open inwardly of said housing, means including bearing members for pivotally supporting said gate for opening and closing movement, and supporting members secured to said housing and having downwardly projecting arms provided with inwardly projecting lugs at the lower ends thereof, said arms projecting through said bearing members and said lugs supportingly engaging said bearing members for rocking movement thereof on said lugs, the axes of rocking movement of the bearing members on said lugs being disposed substantially parallel to the portions of the gate housing adjacent to the supporting members.

13. In a draft regulator, an open ended gate housing, a control gate disposed to open inwardly of said housing, means including bearing members for pivotally supporting said gate for opening and closing movements, said bearing members extending transversely the axis of pivotal movement of the gate, and supporting members on said housing having spaced depending arms provided with means for rockingly supporting said bearing members on axes disposed transversely the pivotal axis of the gate and disposed substantially parallel to the portions of the gate housing adjacent to said supporting means.

14. In a draft regulating device, an open ended gate housing, a control gate disposed to open inwardly of said housing, pivot members on said gate adjacent opposite side edges thereof, bearing members having V-shaped recesses in which said pivot members are pivotally supported, means on the housing for pivotally supporting the bearing members, the axes of pivotal movement of the bearing members on the gate housing being disposed transversely of the axes of pivotal movement of the pivot members in the V-shaped recesses, and means associated with the gate and movable therewith and disposed vertically below the bearing members for limiting upward bodily displacement of the gate relative to the bearing members.

15. In a draft regulating device, an open ended gate housing, a control gate disposed to open inwardly of said housing, pivot members on said gate adjacent opposite edges thereof, bearing members having V-shaped recesses in which said pivot members are pivotally supported, means on the housing for pivotally supporting the bearing members on the housing, the axes of pivotal movement of the bearing members on the housing being disposed transversely of the axes of pivotal movement of the pivot members in the V-shaped recesses, the inner edge portions of the bearing members having recesses therein, and means associated with said gate and movable therewith and extending into said recesses for limiting horizontal bodily displacement of the gate relative to the bearing members.

EDWARD A. FIELD.

References Cited in the file of this patent

UNITED STATES PATENTS

| Number | Name | Date |
|---|---|---|
| 456,528 | Adolphus | July 21, 1891 |
| 1,856,410 | Bryce | May 3, 1932 |
| 1,993,069 | McConnell, Jr. | Mar. 5, 1935 |
| 2,522,786 | Hubbart | Sept. 19, 1950 |

FOREIGN PATENTS

| Number | Country | Date |
|---|---|---|
| 27,438 | Great Britain | Dec. 16, 1904 |